US007418261B2

(12) United States Patent
Forbes et al.

(10) Patent No.: US 7,418,261 B2
(45) Date of Patent: Aug. 26, 2008

(54) STATUS REPORTING SYSTEM AND METHOD

(75) Inventors: Ben C Forbes, Seattle, WA (US); Michael A D'Annunzio, Seattle, WA (US); C. L. Fagan, Bellevue, WA (US); Tri M Phan, Renton, WA (US)

(73) Assignee: The Boeing Company, Chicago, IL (US)

( * ) Notice: Subject to any disclaimer, the term of this patent is extended or adjusted under 35 U.S.C. 154(b) by 596 days.

(21) Appl. No.: 11/108,944

(22) Filed: Apr. 19, 2005

(65) Prior Publication Data

US 2005/0233739 A1 Oct. 20, 2005

Related U.S. Application Data

(60) Provisional application No. 60/563,888, filed on Apr. 20, 2004.

(51) Int. Cl.
*H04B 1/16* (2006.01)
*G06F 15/48* (2006.01)

(52) U.S. Cl. ...................... 455/431; 455/12.1; 455/518; 701/213; 701/117; 340/993

(58) Field of Classification Search ................. 455/341, 455/427, 431, 437, 438, 12.1, 552.1, 403, 455/518; 701/117, 213, 200, 214; 340/993, 340/825.49
See application file for complete search history.

(56) References Cited

U.S. PATENT DOCUMENTS

| | | | | |
|---|---|---|---|---|
| 6,496,775 | B2 * | 12/2002 | McDonald et al. | 701/213 |
| 2002/0077750 | A1 * | 6/2002 | McDonald et al. | 701/213 |
| 2004/0039527 | A1 * | 2/2004 | McDonald et al. | 701/213 |

* cited by examiner

*Primary Examiner*—Tony T. Nguyen
(74) *Attorney, Agent, or Firm*—Harness, Dickey & Pierce, P.L.C.

(57) ABSTRACT

A status reporting system for components used in a mobile platform includes a fault manager within the mobile platform for assigning a state indicator to each component. Each state indicator indicates the operational current state of the component. A management system external to the mobile platform, in one example being a ground based management system, is in communication with the mobile platform via a wireless communication link. A component summary including the state indicators of all the components is periodically transmitted from the mobile platform as an information packet, via the wireless link, to the management system for review. The management system can thus remotely monitor the operational status of various important components on a periodic basis, for example every five minutes. This saves significant bandwidth over that which would be required if a continuous wireless link was to be employed to remotely monitor various components on the mobile platform.

18 Claims, 4 Drawing Sheets

STATUS REPORTING SYSTEM AND METHOD

CROSS-REFERENCE TO RELATED APPLICATIONS

This application claims the benefit of U.S. Provisional Application No. 60/563,888, filed on Apr. 20, 2004. The disclosure of the above application is incorporated herein by reference.

FIELD OF THE INVENTION

The present invention relates to mobile platforms and more particularly to a status reporting system and method for a mobile platform.

BACKGROUND OF THE INVENTION

Present day mobile platforms, for example aircraft, are complete with numerous complex components. Many of these components are integral to the operation of the mobile platform, while others are used for entertainment or information exchange by passengers. As the complexity and number of these components increases, it becomes necessary to monitor their status by a management system (typically located apart from the mobile platform, such as a ground control station in the case of an aircraft).

However, the total amount of information about each and every component is relatively large and would require large amounts of bandwidth to transmit to a management system. Moreover, maintaining a continuous communications link to continuously monitor the components and transmit status information is even more expensive. Still further, present day systems often require significant work at a terrestrial base station to gather relevant information and process the information into readily useable form. This often increases the resources needed at the terrestrial base station.

SUMMARY OF THE INVENTION

The present invention provides a system and method for quickly, efficiently, inexpensively, and remotely monitoring the operational status of components within a mobile platform. In one preferred form the status reporting system includes a fault manager within the mobile platform for assigning a state indicator to at least one component of the mobile platform. The state indicator is operable to indicate the current state of the component. A management system remote from the mobile platform is in communication with the mobile platform. A component summary including the state indicator is periodically transmitted from the mobile platform via a wireless link, and in one preferred implementation via a transponded satellite link, to the management system for review by the management system. If the management system detects that an error or fault exists in any of the components being monitored, it can immediately establish a continuous communication link with the mobile platform to obtain additional information to isolate/identify the problem and/or component being affected.

The system and method reduces the resources required for the management system because the various items of status information are collected and presented in an organized fashion that facilitates analysis by the management system.

The features, functions, and advantages can be achieved independently in various embodiments of the present inventions or may be combined in yet other embodiments.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
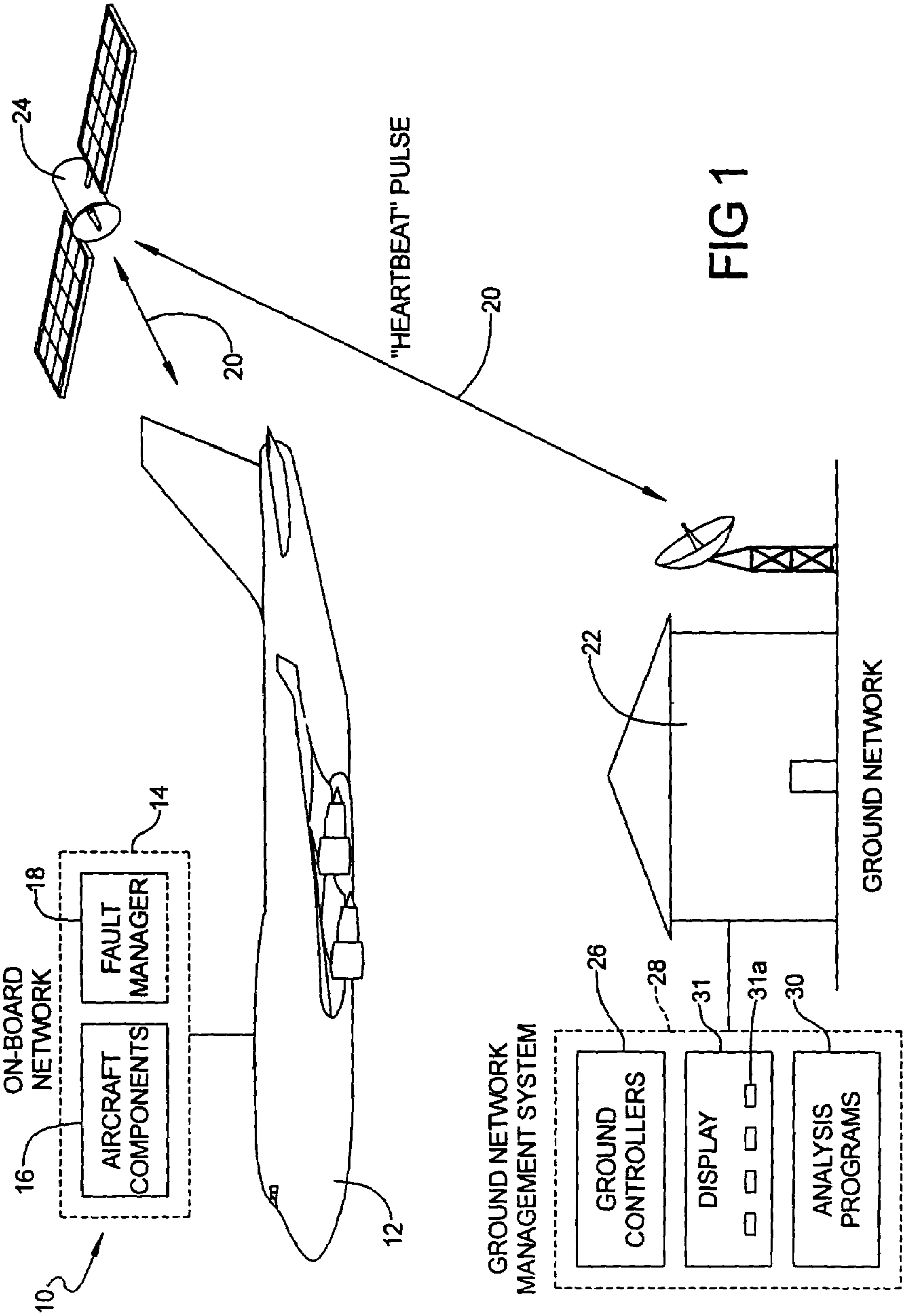
FIG. 1 is a schematic view of a status reporting system constructed according to the principles of the present invention.

With reference to FIG. 1, a preferred embodiment of a status reporting system constructed according to the principles of the present invention is generally indicated by reference numeral 10. The status reporting system 10 is shown in operative association with an aircraft 12. It should be appreciated, however, that various other mobile platforms may be employed with the present invention, including rotor craft, land based motor vehicles such as busses, trucks and trains, or marine vessels such as ships. Thus, the reference to aircraft 12 throughout the following description should be understood as being merely exemplary of one specific application of the present invention. The status reporting system 10 includes an on-board network 14 located within the aircraft 12. The on-board network 14 includes a plurality of aircraft components 16 in communication with a fault manager 18. The aircraft components 16 may be various software programs, computer systems, avionics systems, or mechanical engine/avionic components located within the aircraft 12. The fault manager 18 is in communication with the aircraft components 16 within the on-board network 14.

Generally speaking, the status reporting system 10 operates by assigning a fault or state indicator using the fault manager 18 to each of the aircraft components 16. The fault manager 18 continuously monitors the aircraft components and assigns a state indicator to the aircraft components 16. The state indicators are continuously updated by the fault manager 18. If an event occurs that changes the state of an aircraft component 16, the fault manager 18 assigns an appropriate state indicator to the aircraft component 16. The state indicator, along with other selected information, is then transmitted from the aircraft 12 in a "heartbeat" pulse 20 to a ground station 22. In the particular example provided, the heartbeat pulse 20 is first relayed by an orbiting transponded satellite 24 providing a transponded satellite communications link, between the aircraft 12 and the ground station 22. Thus, it will be appreciated that the heartbeat pulse 20 contains updated status information preferably each time it is transmitted from the aircraft 12.

The "heartbeat" pulse 20, hereinafter referred to as an "inform", is a data packet of information containing the state indicators for each of the aircraft components 16, as well as various other relevant pieces of information. The inform 20 is transmitted from the aircraft 12 periodically, for example every five minutes, in one preferred implementation of the system 10. As the inform 20 is received by the ground station 22, the inform 20 enters a ground network management system 26. The inform 20 is then analyzed by ground controllers 28 or automated software/analysis programs 30. A display 31 having a plurality of visual indicators 31*a* is in communication with the ground controllers 28. If any state indicators 31*a* indicating a fault or alert are assigned to aircraft components 16, the ground network management system 26 may then query the aircraft 12 to access the on-board network 14 and examine the aircraft components 16 to analyze the indicated fault or alert. The state indicators 31*a* can include text and/or color designations to better help an operator to immediately see status changes.

Figure 2:
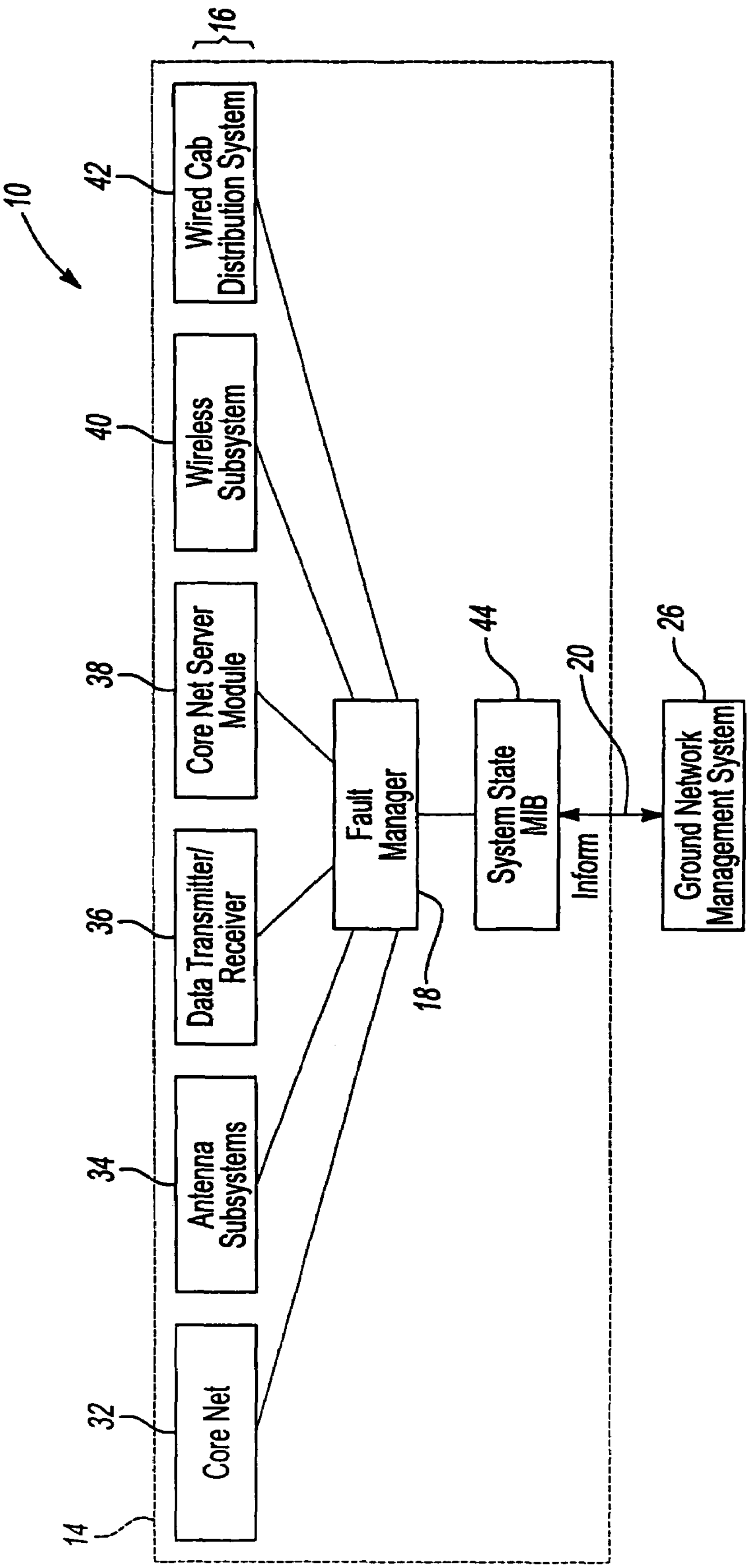
FIG. 2 is a schematic view of the status reporting system of FIG. 1 used in conjunction with an exemplary on-board computer network system.

Turning now to FIG. 2, the status reporting system 10 will be described in greater detail in operative association with an exemplary on-board network 14. The on-board network 14 includes a computer server cabinet 32, antenna subsystems 34, a data transmitter/receiver 36, a server 38, a wireless subsystem 40, and a wired cab distribution system 42 that together form the aircraft components 16. Each of the components 16 include a management information base (MIB). The MIB is a database for each component 16 that contains detailed information relating to the component 16. The MIB's for each of the components 16 are in communication with the fault manager 18 using a simple network management protocol (SNMP).

Using the SNMP and other fault detection mechanisms, and with access to each MIB for each component 16, the fault manager 18 assigns a state indicator for each component 16. For example, the state indicators may be selected from one of four values such as "Fault", "Alert", "Good", and "Not Applicable". A "Fault" state indicates that the particular component 16 is non-functional. An "Alert" state indicates that the particular component 16 is still functional but at a reduced capability or that an event has occurred that indicates a possible future failure. For example, a "Disk-is-Full" performance threshold alert may be assigned to the computer server cabinet 38 if the computer cabinetry 38 is running low on system memory. A "Good" state indicates that the particular component 16 is performing nominally. A "Not Applicable" state indicates that the particular component 16 is not installed within the on-board network 14.

The state indicators for each component 16 are then stored in an upper level SNMP MIB referred to as the system state MIB 44. The system state MIB 44 is a database having the state indicators for each component 16 as well as various other pieces of information, as will be described below. The system state MIB 44 is then sent as the inform 20 via a transponded satellite link to the ground network management system 26 for analysis on a periodic basis.

Figure 3:
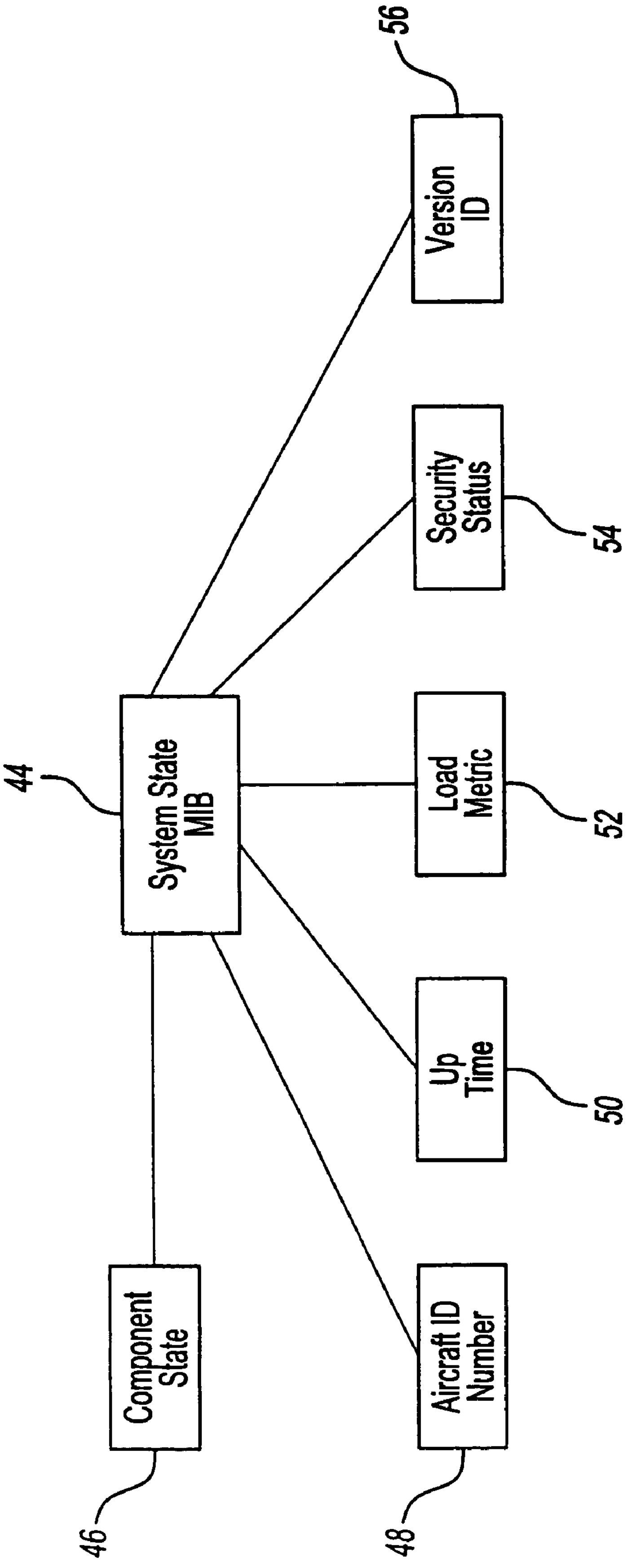
FIG. 3 is a schematic view of various fields employed with a system state "heartbeat" pulse used in the status reporting system of the present invention.

Turning briefly to FIG. 3, the system state MIB 44 has a plurality of fields, at least one for each component 16. In the particular example provided, the system state MIB 44 is comprised of fields including a component state field 46, an aircraft identification field 48, an Up-Time field 50, a load metric field 52, a security status field 54, and a component version identification field 56. These fields have been selected as representing pertinent and highly desirable information for the ground network management system 26 to have to quickly identify any issues that may arise, while still minimizing the amount of information transmitted via the inform 20. However, it will be appreciated that any other fields specific to a particular implementation could be included.

The component state field 46 stores the particular state indicator (i.e., "Fault", "Alert", "Good", "Not Applicable") assigned by the fault manager 18 for each specific component 16. The aircraft identification field 48 stores a reference number that uniquely identifies a given aircraft 12 (e.g., a tail number). The Up-Time field 50 stores a data value relating to the amount of time a given component has been operational. The load metric field 52 stores a value that relates to how much system use or load a given component 16 is experiencing. This allows the ground network management system 26 to determine if a "fault" or "alert" state is based simply on the load metric (e.g., if a system component 16 is performing slowly and is assigned an "Alert" state, it may simply be do to a high load metric indicating greater than normal use by passengers/other users on the aircraft 12). The security status field 54 stores a value indicating whether a given component 16 has been tampered with via a cyberspace attack or any other form of security compromise. Again, this allows the ground network management system 26 to quickly determine if a "Fault" or "Alert" state for a given component 16 is due to external tampering. The component version identification field 56 stores a value relating to the current version of the component 16 that is being used on the aircraft 12. This allows the ground network management system 26 to easily determine what specific kinds of components 16 are on the aircraft 12 and whether they are updated or out of date versions. The component version identification field 56 may be a version number in the case of software, or a serial number when the component 16 is hardware.

Figure 4:
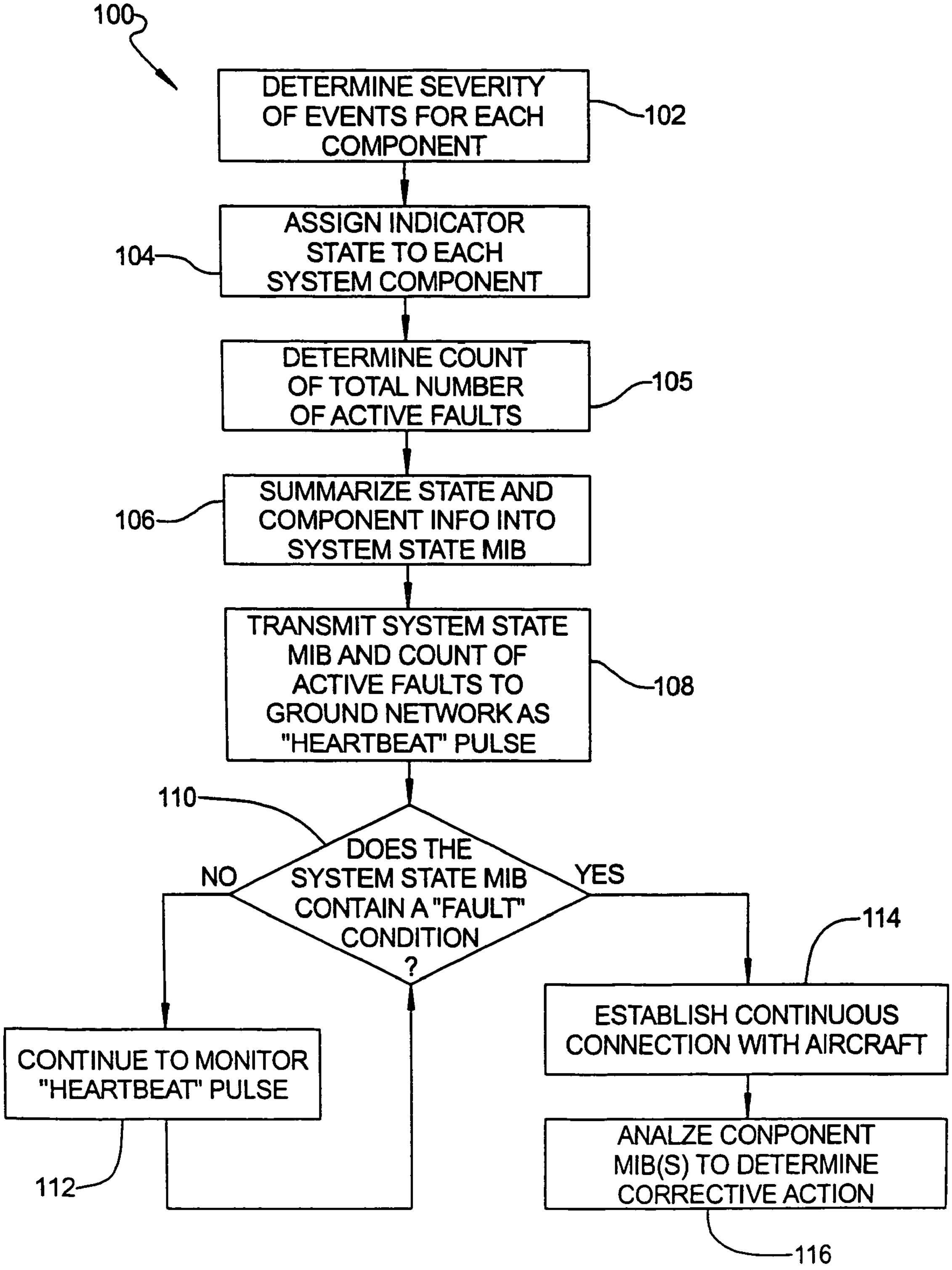
FIG. 4 is a flow chart illustrating a preferred operation of the status reporting system according to the principles of the present invention.

Turning now to FIG. 4, a method for monitoring the system state of an aircraft 12 is indicated generally by reference numeral 100. The method 100 begins when the fault manager 18 determines the severity of events, if any occur, for each component 16 at operation 102. Events may range from critical or major events that may involve the loss of a component 16, or minor events that may involve less than full performance from a component 16. Then, at operation 104, the fault manager 18 assigns an indicator state to each of the components 16 based on the occurrence of any events. As noted above, the state indicator may range from "Fault" to "Not Applicable". Also a count of the total number of active faults is taken at operation 105.

The status reporting system 10 next summarizes the state indicators for each component 16, as well as various general information for each component, into the system state MIB 44 at operation 106. In the particular example provided, the system state MIB 44 is comprised of those fields described in FIG. 3. However, other information may also be summarized in the system state MIB 44.

The system state MIB 44, as well as the total number of active faults, is then transmitted to the ground network management system 26 at operation 108 via the inform 20. The system state MIB 44 is essentially transmitted as a periodic pulse of information. This allows the ground network management system 26 to analyze the data stored within the system state MIB 44 at periodic intervals (for example every five minutes) without the need and expense of a continuous transmission from the aircraft 12.

At operation 110, the ground network management system 26 then analyzes the system state MIB 44 and the total active count fault to determine if any components 16 have a "Fault" state indicator attached thereto. Moreover, the ground network management system 26 analyzes and stores "Warning" indicators for future action once the aircraft 12 has landed or is undergoing normal maintenance. If no active "Fault" state indicators are present in the system state MIB 44 (i.e., the active fault count of operation 105=0), the ground network management system 26 continues to monitor the pulses of information transmitted from the aircraft 12 (i.e., each inform 20 that it receives) at operation 112, and the method 100 repeats for each pulse.

If, however, a "Fault" state indicator is present for a component 16 in the system state MIB 44, the ground network management system 26 establishes a continuous transponded satellite transmission link with the aircraft 12 at operation 114. This allows the ground network management system 26 to access the component MIB for whichever of the components 16 have a "Fault" state indicator, as indicated at operation 116, in order to determine the cause, solution, and severity of the "Fault". Alternatively, the "Fault" state indicator may be explained from an analysis of the fields within the system state MIB 44 without a need to establish a continuous communication with the aircraft 12.

Using the above method, a ground monitoring system (or other remotely located monitoring station) can monitor and stay informed of the status and condition of important components/subsystems of the aircraft 12 without the need for a large bandwidth signal from the aircraft 12. In the event of a problem, the ground system can establish a more expensive continuous communication link with the aircraft 12 to analyze the problem.

The system 10 of the present invention provides the additional significant benefit of gathering pertinent status/fault information, in a highly automated fashion, for every mobile platform being monitored by the system 10. When monitoring dozens or hundreds of mobile platforms, such as commercial aircraft in flight, it should be apparent that the system 10 significantly reduces the burden on the ground-based management system of acquiring the pertinent status/fault information. This enables the ground-based management system to perform its tasks with significantly fewer resources than would otherwise be required.

The system and method of the present invention also facilitates more rapid pinpointing of potential faults with various components, as well as providing for several levels of detail for better determining when a given status/fault requires immediate escalation/attention by the ground-based management system.

Still further, the present invention provides the advantage that with the mobile platform initiating the transmission of the informs 20, the ground-based management system can logically conclude that if a periodic inform 20 is not received from a given mobile platform when expected, that immediate action should be taken to establish a continuous communications link to investigate the cause of the missed transmission by the given mobile platform.

While various preferred embodiments have been described, those skilled in the art will recognize modifications or variations which might be made without departing from the inventive concept. The examples illustrate the invention and are not intended to limit it. Therefore, the description and claims should be interpreted liberally with only such limitation as is necessary in view of the pertinent prior art.

What is claimed is:

1. A status reporting system for a component in a mobile platform comprising:

a fault manager disposed on the mobile platform for assigning a state indicator to the component, the state indicator operable to indicate a current operational state of the component;

a database forming a component summary including the state indicator, and being in communication with the fault manager;

a management system external to the mobile platform and in communication with the mobile platform; and wherein the component summary is periodically transmitted from the mobile platform to the management system via a wireless communications link for review by the management system.

2. The status reporting system of claim 1, wherein the component summary includes a plurality of fields containing information relating to the mobile platform and relating to the component, in addition to the state indicator.

3. The status reporting system of claim 1, wherein the component summary is transmitted approximately every five minutes.

4. The status reporting system of claim 1, wherein the state indicator represents pre-defined conditions for the component.

5. The status reporting system of claim 1, wherein the component summary includes a version identifier, the version identifier uniquely identifying a specific version of the component for the management system.

6. The status reporting system of claim 1, wherein the component summary includes an identification number for uniquely identifying the mobile platform to the management system.

7. The status reporting system of claim 1, wherein the component summary includes an up-time field for tracking how long the component has been functional for the management system.

8. The status reporting system of claim 1, wherein the component summary includes a load metric for tracking how many users have accessed the component over a given time period for the management system.

9. The status reporting system of claim 1, wherein the component summary includes a security status for determining if the component is secure for the management system.

10. The status reporting system of claim 1, further comprising a database in the mobile platform, the database operable to store information regarding the component.

11. The status reporting system of claim 10, wherein the management system accesses the database if the component has a state indicator indicating predefined conditions have been met.

12. A status reporting system for remotely monitoring a component used in a mobile platform, the system comprising:

a fault manager within the mobile platform for assigning a state indicator to the component, the state indicator operating to indicate a current operational status of the component;

a database forming a component summary including the state indicator, a management system located remotely from the mobile platform;

a transponded satellite communications link for wireless connecting the fault manager and the management system in communication with each other;

the component summary being periodically transmitted from the mobile platform, in accordance with a predetermined time frame, to the management system via the satellite communications link for review by the management system.

13. The system of claim 12, wherein the component summary includes a plurality of fields containing information relating to the mobile platform and the component.

14. The system of claim 12, wherein the state indicator indicates a plurality of predefined operating conditions for the component.

15. The system of claim 12, wherein the component summary includes a version identifier that uniquely identifies a specific version of the component for the management system.

16. The system of claim 15, wherein the component summary comprises an identification number associated uniquely with the mobile platform.

17. The system of claim 15, wherein the component summary includes at least one of:

a load metric for tracking how many users have accessed the component over a given time period; and a security status for determining if the component is secure for the management system.

18. A method for reporting the operational status of a plurality of components used in a mobile platform, the method comprising:

assigning a state indicator to each of the components that indicates a real time operational state of each said component;

assimilating the state indicators into a data packet of information;

using a wireless transmission medium to periodically transmit the data packet from the mobile platform at a predetermined time interval, the data packet being updated with new state indicators prior to each transmission from the mobile platform;

using a monitoring system located remotely from the mobile platform to receive the data packets and analyze the operational status of each said component in real time; and if any one of the components is indicated as having a predetermined operational status, then establishing a continuous wireless communications link between the monitoring system and the mobile platform to further analyze the one component having the predetermined operational status.

* * * * *